United States Patent [19]

Nozawa et al.

[11] Patent Number: 4,507,738

[45] Date of Patent: Mar. 26, 1985

[54] NUMERICAL CONTROL METHOD

[75] Inventors: Ryoichiro Nozawa, Tokyo; Hideaki Kawamura, Hachioji, both of Japan

[73] Assignee: Fanuc Ltd., Minamitsuru, Japan

[21] Appl. No.: 433,560

[22] Filed: Oct. 8, 1982

[30] Foreign Application Priority Data

Oct. 9, 1981 [JP] Japan .................................. 56-161238

[51] Int. Cl.³ ........................ G06F 15/46; G05B 19/18
[52] U.S. Cl. .................................... 364/474; 318/568; 318/573; 364/169; 364/191
[58] Field of Search ................ 364/167–171, 364/474, 475, 191–193; 318/568, 573

[56] References Cited

U.S. PATENT DOCUMENTS

| | | | |
|---|---|---|---|
| 3,534,396 | 10/1970 | Hart et al. | 364/192 |
| 3,629,558 | 0/1971 | Coggin | 364/191 |
| 3,739,157 | 6/1973 | Bobrowicz et al. | 364/191 |
| 4,163,284 | 7/1979 | Kishi et al. | 364/474 |

*Primary Examiner*—Joseph F. Ruggiero
*Attorney, Agent, or Firm*—Staas & Halsey

[57] ABSTRACT

A numerical control method for moving a tool along a commanded curve on a curved surface, which includes entering the curved surface defined by data representing a mathematical expression or by a group of numerical data, entering numerical control data specifying a projected curve obtained by projecting the commanded curve onto a predetermined plane, successively finding positional coordinates on the commanded curve through use of the curved surface data and numerical control data specifying the projected curve, and controlling the position of the tool on the basis of the positional coordinates.

8 Claims, 6 Drawing Figures

NUMERICAL CONTROL METHOD

BACKGROUND OF THE INVENTION

This invention relates to a numerical control method and, more particularly, to a numerical control method for transporting a tool in accordance with a predetermined curve on a given curved surface.

The following two techniques are available conventionally for cutting a curved surface by transporting a tool along a predetermined curve on the surface:

(a) a numerical control (NC) command tape is created by means of an automatic programming apparatus, and the tape is fed into a tape reader for reading in data on the basis of which the curved surface is cut, and (b) numerical control is performed along two axes, namely the X and Y axes, by means of a numerical control device, and profiling control is effected along the Z axis by profiling the shape of a model using a stylus, this method of control being referred to as an NTC machining method hereinafter.

In the former method, which relies upon the automatic programming apparatus, considerable labor and expense are required to create the tape, and the resulting NC command tape is of considerable length. Moreover, even slight modifications in the tool path require that the entire tape be remade. With the NTC machining method, on the other hand, it is necessary to create the model, and machining speed and precision cannot be enhanced as they can be with full numerically controlled machining.

SUMMARY OF THE INVENTION

Accordingly, an object of the present invention is to provide a numerical control method which enables an NC tape to be created in a simple manner even when a sophisticated curved surface is to be cut.

Another object of the present invention is to provide a numerical control method which is extremely economical and which enables the length of an NC command tape to be greatly reduced.

In order to accomplish the above objects, a numerical control method is provided for moving a tool along a commanded curve on a curved surface, which includes entering a curved surface defined by data representing a mathematical expression or by a group of numerical data, entering numerical control data specifying a projected curve obtained by projecting the commanded curve onto a predetermined plane, successively finding positional coordinates on the commanded curve through use of the curved surface data and numerical control data specifying the projected curve, and controlling the position of the tool on the basis of the positional coordinates.

Other features and advantages of the invention will be apparent from the following description in connection with the accompanying drawing.

DESCRIPTION OF THE PREFERRED EMBODIMENT

Figure 1:
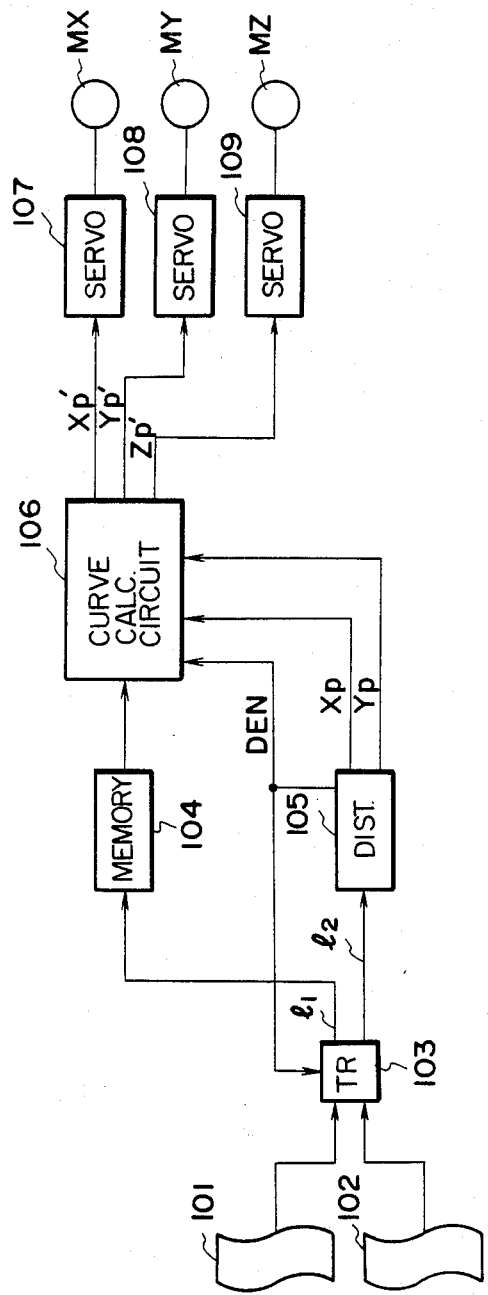
FIG. 1 is a block diagram of an embodiment of an apparatus for practicing the method of the present invention.
Figure 3:
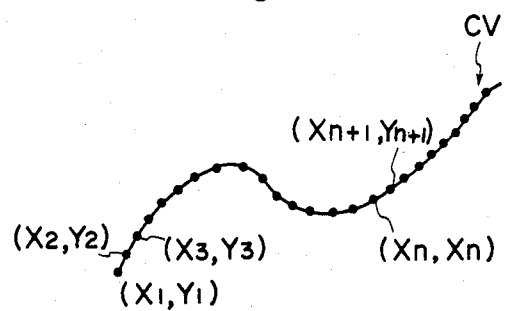
FIGS. 3 and 4 are diagrams useful in describing the creation of NC data specifying a projected curve.

As shown in FIG. 1, an arrangement for practicing the method of the invention employs a paper tape 101 which bears punched mathematical information when mathematical expressions define the curved surface, or numerical data when such data defines the surface. For example, in a case where the curved surface is a sphere, the data punched into the tape defining the surface will be:

$$X^2 + Y^2 + Z^2 = R^2 \qquad (1)$$

or $$Z = R^2 - (X^2 + Y^2) \qquad (2)$$

where R is the radius of the sphere and X, Y and Z are the three control axes. A second paper tape 102 also is provided. When a commanded curve (namely a curve which indicates the path along which a tool is to travel) on the surface of the sphere is projected onto a predetermined plane of projection, say the XY plane, numerical control data is created so as to move the projected tool position along the projected curve. Such data is punched into the second paper tape 102. The numerical control data for moving the projected tool position along the projected curve, which data is referred to as projected curve data hereinafter, is created in the same way as ordinary numerical control (NC) data. For example, a portion of a curved line that cannot be expressed by a straight line segment or circular arc is created by a polygonal approximation based on a multiplicity of straight line segments, as illustrated in FIG. 3.

In FIG. 1, the items of curved surface data and projected curve data are shown as punched into separate paper tapes. It should be noted, however, that both types of data may be punched into the same paper tape provided that they are provided with an identification code.

The arrangement of FIG. 1 includes a tape reading circuit 103 for reading the curved surface data from paper tape 101 and delivering it on line $l_1$, and for reading the projected curve data from paper tape 102 and delivering it on line $l_2$. The curved surface data on line $l_1$, as represented by Eq. (2), is applied to a memory 104 for storing the data. The projected curve data on line $l_2$ is applied to a pulse distributing circuit 105 which performs a pulse distribution operation on the basis of this data for producing distributed pulses Xp and Yp. The distributed pulses Xp and Yp, as well as the output of the curve surface data memory 104, are applied to a curve calculating circuit 106 for calculating the commanded curve on the curved surface.

Figure 2:
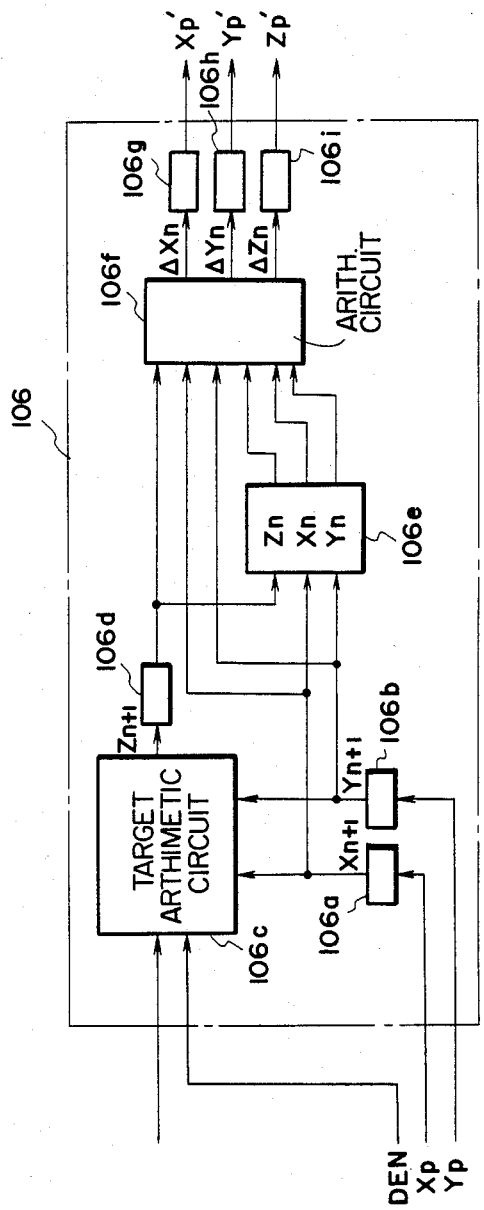
FIG. 2 is a block diagram of a calculating circuit included in the apparatus of FIG. 1.

As shown in FIG. 2, the curve calculating circuit 106 includes X- and Y-axis target position registers 106a and 106b for counting the distributed pulses Xp and Yp up or down in accordance with their sign for storing the target positions $X_{n+1}$ and $Y_{n+1}$ in the X and Y directions on the plane of projection. Also included is a Z-axis target position arithmetic circuit 106c which receives the curved surface data indicated by Eq. (2), as well as the target positions $X_{n+1}$ and $Y_{n+1}$, for computing, from Eq. (2), the target position $Z_{n+1}$ along the direction of the Z axis on the commanded curve at regular time intervals $\Delta T$ or upon completion of each pulse distribution operation for the currently prevailing block. Further included are a Z-axis target position register 106d for storing $Z_{n+1}$ and a memory 106e for storing the X-, Y- and Z-target positions $X_n$, $Y_n$ and $Z_n$ which prevailed a time $\Delta T$ earlier, on which prevailed in the preceding block. An incremental arithmetic unit 106f is included which performs the operations:

$$X_{n+1} - X_n \rightarrow \Delta X_n \quad (3)$$

$$Y_{n+1} - Y_n \rightarrow \Delta Y_n \quad (4)$$

$$Z_{n+1} - Z_n \rightarrow \Delta Z_n \quad (5)$$

for computing the incremental values $\Delta X_n$, $\Delta Y_n$, $\Delta Z_n$ along each axis, along with pulse distributing circuits 106g through 106i for performing pulse distribution operations along three axes simultaneously on the basis of the X-, Y- and Z-axis incremental values $\Delta X_n$, $\Delta Y_n$ and $\Delta Z_n$, respectively, thereby producing distributed pulses Xp', Yp' and Zp'.

Returning to FIG. 1, the distributed pulses Xp', Yp and Zp' from the curve calculating circuit 106 are applied to respective servo circuits 107, 108 and 109 for controlling the drive of X-, Y- and Z-axis servo motors MX, MY and MZ, respectively.

In the operation of the apparatus shown in FIGS. 1 and 2, curved surface data indicated by Eq. (2) is read in from the paper tape 101 and stored in the curved surface data memory 104 in advance. When this has been accomplished, projected curve data, namely the NC data for moving a tool along a projected curve, is read in from the paper tape 102 and applied to the pulse distributing circuit 105. Assume that the projected curve is as designated at CV in FIG. 3. The NC data is created by approximating this curve with a multiplicity of straight line segments. Accordingly, the pulse distributing circuit 105 performs a pulse distribution operation on the basis of the incremental values $(X_2-X_1)$ and $(Y_2-Y_1)$ for generating distributed pulses Xp and Yp. These pulses Xp and Yp are counted up or down, in accordance with their sign, by the X- and Y-target position registers 106a and 106b, respectively. When the pulse distribution operation is completed, the pulse distributing circuit 105 produces a distribution end signal DEN which is applied to the tape reading circuit 103 and the Z-axis target position arithmetic circuit 106c in the curve calculating circuit 106. The tape reading circuit 103 responds to the signal DEN by immediately reading in the the next group of NC data from the paper tape 102, so that processing is executed just as described above. Meanwhile, the Z-axis target position arithmetic circuit 106c responds to the signal DEN by performing the operation of Eq. (2) under the conditions $X=X_2$, $Y=Y_2$ for computing a position $Z_2$ of the commanded curve, which position is stored in the register 106d. Since the initial postion $(X_1, Y_1, Z_1)$ on the commanded curve will have been stored in the memory 106e, the incremental arithmetic unit 106f immediately performs the operations of Eqs. (3) through (5) to find the X-, Y- and Z-axis incremental values $\Delta X_1$, $\Delta Y_1$ and $\Delta Z_1$, which are then applied to the pulse distributing circuits 106g through 106i, respectively. $X_2$, $Y_2$ and $Z_2$ are stored in the memory 106e in place of X1, Y1 and Z1.

Upon receiving the incremental values $\Delta X_1$, $\Delta Y_1$ and $\Delta Z_1$, the pulse distributing circuits 106g through 106i execute pulse distribution operations simultaneously along three axes to produce the distributed pulses Xp', Yp' and Zp' which are applied to the X-, Y- and Z-axis servo circuits 107 through 109 for driving the X-, Y- and Z-axis motors MX, MY and MZ into rotation, respectively. As a result, the tool (not shown) is transported along the commanded curve on the curved surface.

The foregoing processing is repeated to move the tool along the commanded curve on the curved surface. When viewed in the XY plane of projection, the tool will move along the projected curve CV shown in FIG. 3.

Figure 4:
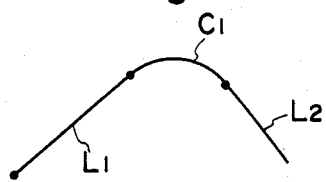

In the foregoing, the projected curve is approximated by a multiplicity of straight line segments. However, in a case where a projected curve can be represented by a straight line or a circular arc, as shown in FIG. 4, a convenient arrangement is to allocate one block of NC data to each straight line $L_1$ and $L_2$ and to the circular arc segment $C_1$, and perform the operations of Eqs. (2) through (5) at regular time intervals $\Delta T$ during the pulse distribution operations based on each group of NC data to find $\Delta X$, $\Delta Y$ and $\Delta Z$, thereby controlling the movement of the tool.

Figure 6:
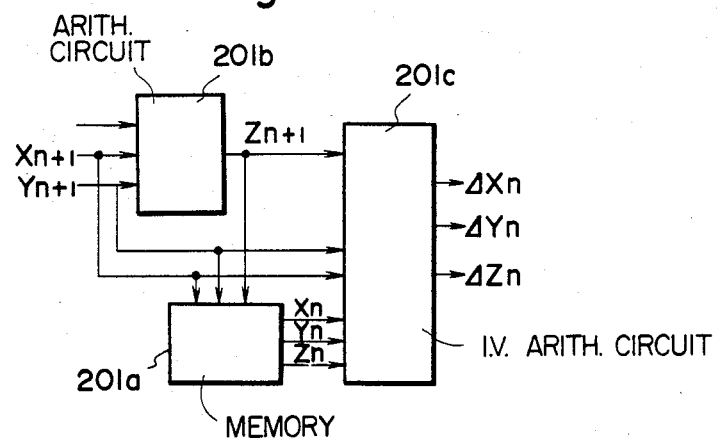
FIG. 6 is a block diagram of a commanded curve calculating circuit included in the arrangement of FIG. 5.
Figure 5:
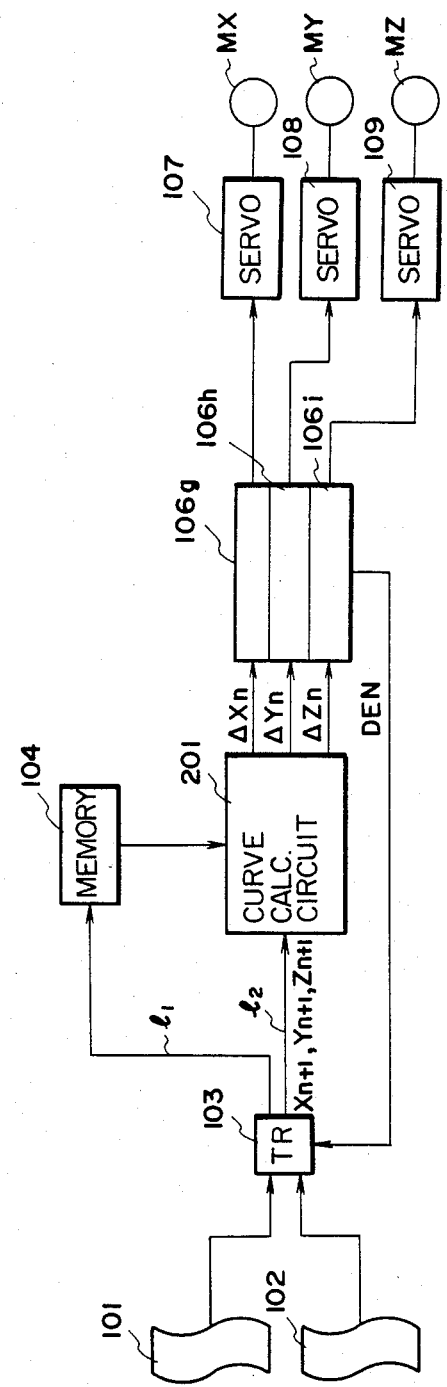
FIG. 5 is a block diagram of another embodiment of an apparatus for practicing the method of the present invention.

Another embodiment of an arrangement for practicing the present invention is illustrated in the block diagrams of FIGS. 5 and 6, in which portions corresponding to those shown in FIG. 1 are designated by like reference characters and are not described again in order to avoid prolixity. We will assume that the projected curve is approximated by a multiplicity of straight lines, and that absolute NC data is created for each straight line segment.

Referring to FIG. 5, numeral 201 denotes a commanded curve calculating circuit which, as shown in FIG. 6, includes a memory 201a for storing the end point coordinates $X_n$, $Y_n$ and $Z_n$ of a projected line in an immediately preceding block, an arithmetic circuit 201b for computing the end point $Z_{n+1}$ along the Z-axis on the commanded curve, $Z_{n+1}$ being computed from the end point $X_{n+1}$ and $Y_{n+1}$ of a projected line in the currently prevailing block and from the curved surface data, and an incremental value arithmetic circuit 201c which performs the operations of Eqs. (3) through (5) using $X_{n+1}$, $Y_{n+1}$ and $Z_{n+1}$ and the abovementioned values $X_n$, $Y_n$ and $Z_n$ for computing incremental values $\Delta X_n$, $\Delta Y_n$ and $\Delta Z_n$.

In the operation of the arrangement shown in FIGS. 5 and 6, curved surface data indicated by Eq. (2) is read in from the paper tape 101 and stored in the curved surface data memory 104 in advance. When this has been accomplished, the first block of NC data $X_1$ and $Y_1$ is read in from the paper tape 102 and applied to the commanded curve calculating circuit 201. The arithmetic circuit 201b within the commanded curve calculating circuit 201 immediately performs the operation of Eq. (2), under the conditions $X=X_1$, $Y=Y_1$, to find $Z_1$. It should be noted that the initial values stored in the memory 201a are $X_o=Y_o=Z_o=0$, indicating that the tool initially is at the origin (zero point). When $Z_1$ is found, the incremental arithmetic circuit 201c performs the operations of Eqs. (3) through (5), specifically:

$$X_1 - X_o \rightarrow \Delta X_1$$

$$Y_1 - Y_o \rightarrow \Delta Y_1$$

$$Z_1 - Z_o \rightarrow \Delta Z_1$$

to find the incremental values $\Delta X_1$, $\Delta Y_1$ and $\Delta Z_1$. These are applied to the pulse distributing circuits 106g through 106i for the X, Y and Z axes, respectively. $X_1$, $Y_1$ and $Z_1$ are stored in the memory 201a upon completion of the incremental value computations. When the incremental values $\Delta X_1$, $\Delta Y_1$ and $\Delta Z_1$ enter the respective pulse distributing circuits 106g through 106i, these respond by executing pulse distribution operations to produce the distributed pulses Xp', Yp' and Zp' that are applied to the respective servo circuits 107 through 109 for the X-, Y- and Z-axes, whereby the respective servo motors MX, MY and MZ are driven into rotation. At the end of the pulse distribution operations, the distribution end signal DEN is applied to the tape reading circuit 103, whereby the next group of data is read in so that processing may be executed in the manner described above. The tool consequently is moved along the commanded curve on the curved surface.

In the foregoing, the curved surface is assumed to be a sphere, but the invention is applicable to any surface, such as an oblique surface or the surface of a cylinder. Furthermore, although the description relates to control effected simultaneously along the three X, Y and Z axes, simultaneous control can be executed along other additional axes as well, such as vertical and horizontal axes A, B, affording control along axes X, Y, Z, A and B.

In accordance with the present invention as described and illustrated hereinabove, a sophisticated curved surface can be cut merely by entering curved surface data and projected curve data obtained by a projection onto a predetermined plane. Moreover, the NC tape can be created very simply, at low cost. The resulting NC tape is also much shorter than an equivalent NC tape created in accordance with the prior art.

As many apparently widely different embodiments of the present invention may be made without departing from the spirit and scope thereof, it is to be understood that the invention is not limited to the specific embodiments thereof except as defined in the appended claims.

What we claim is:

1. A numerical control method for moving a tool along a commanded curve on a curved surface, comprising the steps of:
   entering the curved surface defined by one of data representing a mathematical expression and a group of numerical data;
   entering numerical control data specifying a projected curve obtained by projecting the commanded curve onto a predetermined plane;
   finding positional coordinates successively on the commanded curve through use of the curved surface data and numerical control data specifying the projected curve; and
   controlling the position of the tool on the basis of said positional coordinates.

2. A numerical control method according to claim 1, wherein said step of finding the positional coordinates on the commanded curve comprises the steps of:
   performing a pulse distribution operation based on the numerical control data specifying the projected curve;
   finding positional coordinates successively on the plane of projection by adding up distributed pulses obtained as a result of the pulse distribution operation; and
   finding positional coordinates successively on the commanded curve based on the data defining the curved surface and on each of the positional coordinates on the plane of projection.

3. A numerical control method according to claim 2, wherein the projected curve is approximated by a multiplicity of straight line segments, one block of numerical control data is created for each straight line segment, and positional coordinates are found on the commanded curve each time a pulse distribution operation based on one block of the numerical control data is completed.

4. A numerical control method according to claim 2, wherein positional coordinates are found on the commanded curve at regular time intervals.

5. A numerical control method according to claim 1, wherein the projected curve is approximated by a multiplicity of straight line segments, and one block of numerical control data is created for each straight line segment.

6. A numerical control method according to claim 1, wherein said step of finding positional coordinates on the commanded curve includes the steps of:
   finding the positional coordinates of an end point in a block of data using the numerical control data, which end point lies on the projected curve; and
   finding positional coordinates on the commanded curve based on the positional coordinates of said end point and the data defining the curved surface.

7. A numerical control method according to claim 1, further comprising:
   finding an incremental value along each of a plurality of axes using the positional coordinates on the commanded curve;
   performing a pulse distribution operation on the basis of said incremental value; and
   moving the tool along the commanded curve in dependence upon the distributed pulses obtained as a result of the pulse distribution operation.

8. A numerical control method according to claim 2, further comprising:
   finding an incremental value along each of a plurality of axes using the positional coordinates on the commanded curve;
   performing a pulse distribution operation on the basis of said incremental value; and
   moving the tool along the commanded curve in dependence upon the distributed pulses obtained as a result of the pulse distribution operation.

* * * * *